H. G. DALTON.
CUSHION TIRE.
APPLICATION FILED JAN. 24, 1912.

1,058,559.

Patented Apr. 8, 1913.

Inventor
Harold G. Dalton.

Witnesses

By Victor J. Evans
Attorney

UNITED STATES PATENT OFFICE.

HAROLD G. DALTON, OF CHESTER, PENNSYLVANIA.

CUSHION-TIRE.

1,058,559.

Specification of Letters Patent. Patented Apr. 8, 1913.

Application filed January 24, 1912. Serial No. 673,055.

*To all whom it may concern:*

Be it known that I, HAROLD G. DALTON, a citizen of the United States, residing at Chester, in the county of Delaware and State of Pennsylvania, have invented new and useful Improvements in Cushion-Tires, of which the following is a specification.

The invention relates to tires, and more particularly to the class of cushion tires.

The primary object of the invention is the provision of a tire, in which the body thereof is rendered puncture-proof and does not require the inflating of the same, thus increasing the life of the tire, yet possessing the requisite elasticity or resiliency to absorb shocks incident to its travel.

Another object of the invention is the provision of a tire of this character which is formed of composite material, thereby rendering the same puncture-proof, without destroying its yieldability, thereby assuring longevity to the same.

A further object of the invention is the provision of a tire which is simple in construction, reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

Figure 1:
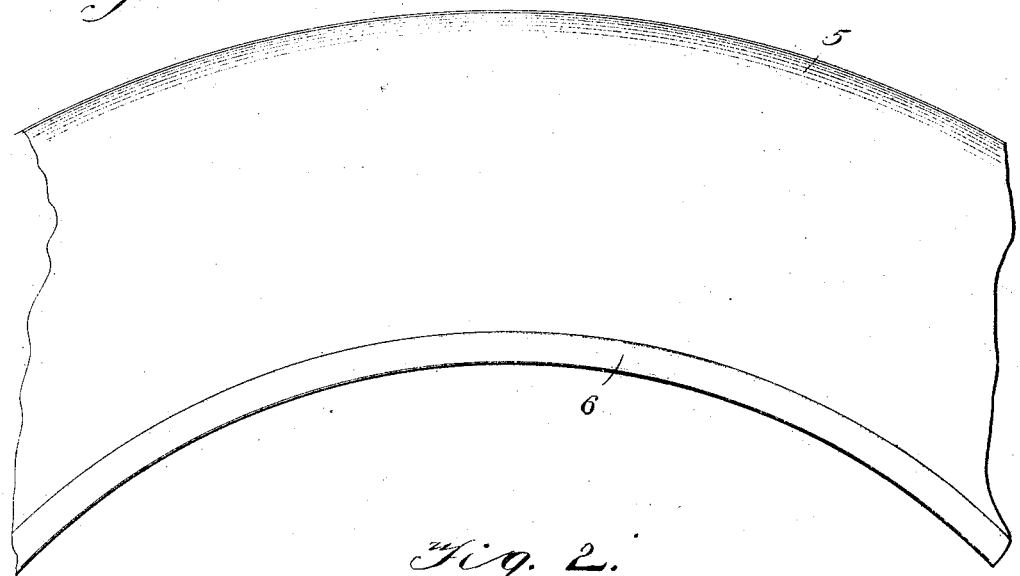
Figure 2:
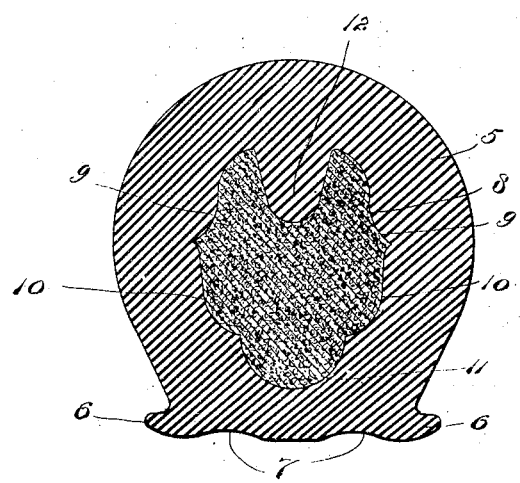

In the drawings: Figure 1 is a fragmentary side elevation of a tire constructed in accordance with the invention. Fig. 2 is an enlarged vertical transverse sectional view.

Similar reference characters indicate corresponding parts throughout the several views of the drawings.

Referring to the drawings by numerals, the tire comprises a body 5, preferably constructed from rubber, the outer contour being similar to the ordinary vehicle tires, and is formed at its inner periphery with laterally and outwardly extending clencher flanges 6, so that the said tire may be mounted upon the rim of a vehicle wheel in the usual manner, the inner periphery, between the flanges 6, being formed with air channels 7 which are spaced apart and extend throughout the inner periphery of the tire body.

The body 5 is formed with a central chamber 8, the side walls being formed with reversely curved surfaces 9 and 10, respectively, while the bottom of the chamber is formed with a concaved collar 11, and the top of the said chamber with an inwardly extending centrally located rib 12.

Entirely filling the chamber 8 and correspondingly shaped to the sides, top and bottom thereof is a core member 13, preferably constructed from chopped rubber and powdered soap-stone, although any other composite material may be employed, if desired.

The rib 12, when depressed, serves to spread the core 13 laterally, thereby distributing the shocks throughout the center and sides of the tire, yet permitting it to yield sufficiently to absorb such shocks. Thus, it will be seen that the tire will possess strength and the requisite resiliency to take up shocks and jars incident to the same, during the travel thereof.

What is claimed is:

A tire comprising a body having a central annular chamber, the side walls of said chamber being formed with reversely curved portions respectively forming irregular surfaces, while the bottom of said chamber is formed with a concave hollow providing a channel, the chamber being entirely surrounded by the body, a vertical rib projecting inwardly from the top of the said chamber in the direction of the hollow in the bottom of the body and having a rounded free edge and a composite core member having greater elasticity than the body and entirely filling the said chamber and embedding the said rib, the said core member being correspondingly shaped with respect to the chamber.

In testimony whereof I affix my signature in presence of two witnesses.

HAROLD G. DALTON.

Witnesses:
JESSE GORE, Jr.,
FRANCES A. WEIR.